July 18, 1972    W. J. WALSH ET AL    3,677,743
MIXING AND SETTLING SEPARATION PROCESS
FOR URANIUM OR PLUTONIUM
Filed June 3, 1969    3 Sheets-Sheet 1

Inventors
William J. Walsh
R. Dean Pierce
Roland A. Anderson
Attorney

Inventors
William J. Walsh
R. Dean Pierce

Attorney

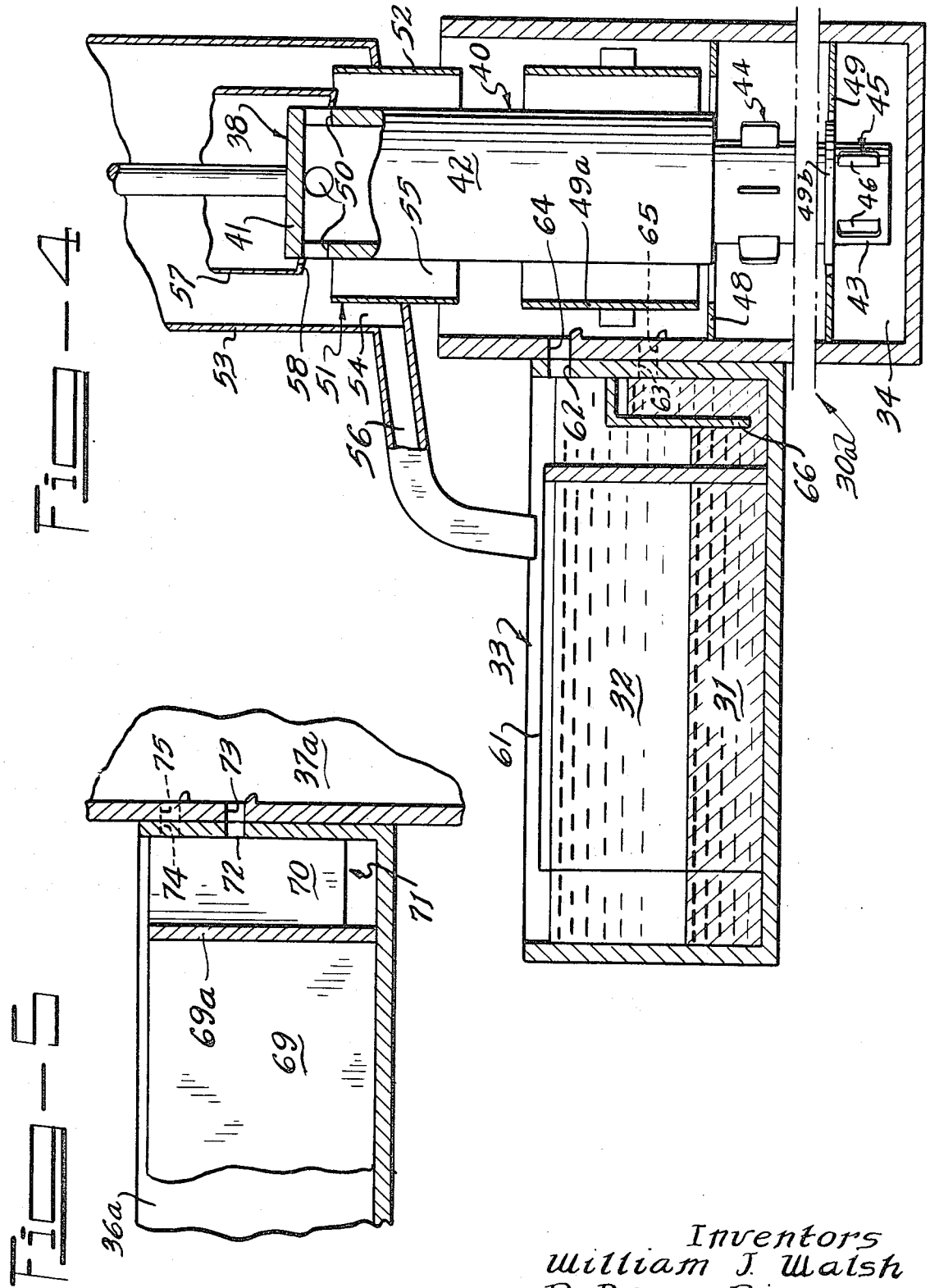

United States Patent Office 3,677,743
Patented July 18, 1972

3,677,743
MIXING AND SETTLING SEPARATION PROCESS FOR URANIUM OR PLUTONIUM
William J. Walsh and Robert Dean Pierce, Naperville, Ill., assignors to the United States of America as represented by the United States Atomic Energy Commission
Filed June 3, 1969, Ser. No. 830,080
Int. Cl. C22b 61/04
U.S. Cl. 75—84.1                                    5 Claims

ABSTRACT OF THE DISCLOSURE

A process and apparatus for separating fission products from uranium and/or plutonium employing liquid metals and liquid salts as solvents is disclosed. A solution of uranium and/or plutonium in a liquid metal is flowed sequentially into and through a plurality of mixer-settlers containing a liquid salt which remove certain fission products from the feed solution as well as a small proportion of the uranium and/or plutonium. The uranium and/or plutonium is removed from the feed solution in another mixer-settler and the liquid metal solvent is recycled to the first mixer-settler where it washes all of the uranium and/or plutonium from the liquid salt present therein. The liquid salt in the first mixer-settler is discarded, the liquid salt in subsequent mixer-settlers is transferred between stages and fresh liquid salt is added to the last mixer-settler. Also disclosed is a system including a plurality of mixer-settlers which include an L-shaped baffle in the settling chamber.

CONTRACTUAL ORIGIN OF THE INVENTION

The invention described herein was made in the course of, or under, a contract with the United States Atomic Energy Commission.

CROSS-REFERENCED APPLICATIONS

This case is related to companion case Ser. No. 829,945 filed June 3, 1969, which is directed to apparatus for practicing the process of this invention.

BACKGROUND OF THE INVENTION

This invention relates to a process and apparatus for mixing and separating multiple phase fluids in which a continuous feed is simultaneously mixed with and separated from multiple batch or captive solvents.

Mixing of multiple liquids is a common phenomenon in chemical engineering processes and often is accomplished in one of two ways, continuous countercurrent flow or batch contact. In the continuous countercurrent type of mixing two immiscible fluids enter an elongated device from opposite ends, flow into each other to provide mixing and exit at the opposite end from which they entered. In batch mixing, multiple immiscible fluids are charged to a vessel and agitated. Thereafter they are allowed to settle out and are removed from the vessel by decanting or other means well known in the art. Mixing and settling operations are usually performed in a unitary apparatus where multiple fluids are mixed at one point in the apparatus and allowed to settle out in another part of the apparatus. Both the countercurrent and the batch apparatus have advantages and disadvantages. So too, the processes have advantages and disadvantages, the batch processes are slow but provide for easy reuse of a particular fluid, while continuous operations are faster they do not particularly lend themselves to reuse of the constituent fluids.

Both batch and continuous flow mixing and settling operations have application to a pyrochemical separation of plutonium from uranium from fission products. Some of the particular chemistry contained herein has previously been made of record in U.S. Pats. 3,326,673; 3,282,681; and 3,284,190 which only contemplated batch operations. From an economic standpoint, batch pyrochemical operations are not competitive with present day continuous flow aqueous processes, and for that reason, among others, it was necessary to invent a new type of separation process and apparatus therefor, described hereinafter with particular reference to a two-phase liquid separation but not limited thereto.

It is the principal object of this invention to provide a process and apparatus in which the primary advantages of both batch and continuous flow mixing and separating are combined into a new process and apparatus therefor.

BRIEF DESCRIPTION OF THE DRAWINGS

This invention may be better understood with reference to the following drawings in which:

FIG. 4 is a section of FIG. 2 taken along line 4—4;
and
FIG. 5 is a section of FIG. 3 taken along line 5—5.

DETAILED DESCRIPTION OF THE PREFERRED EMBODIMENT

Figure 1:
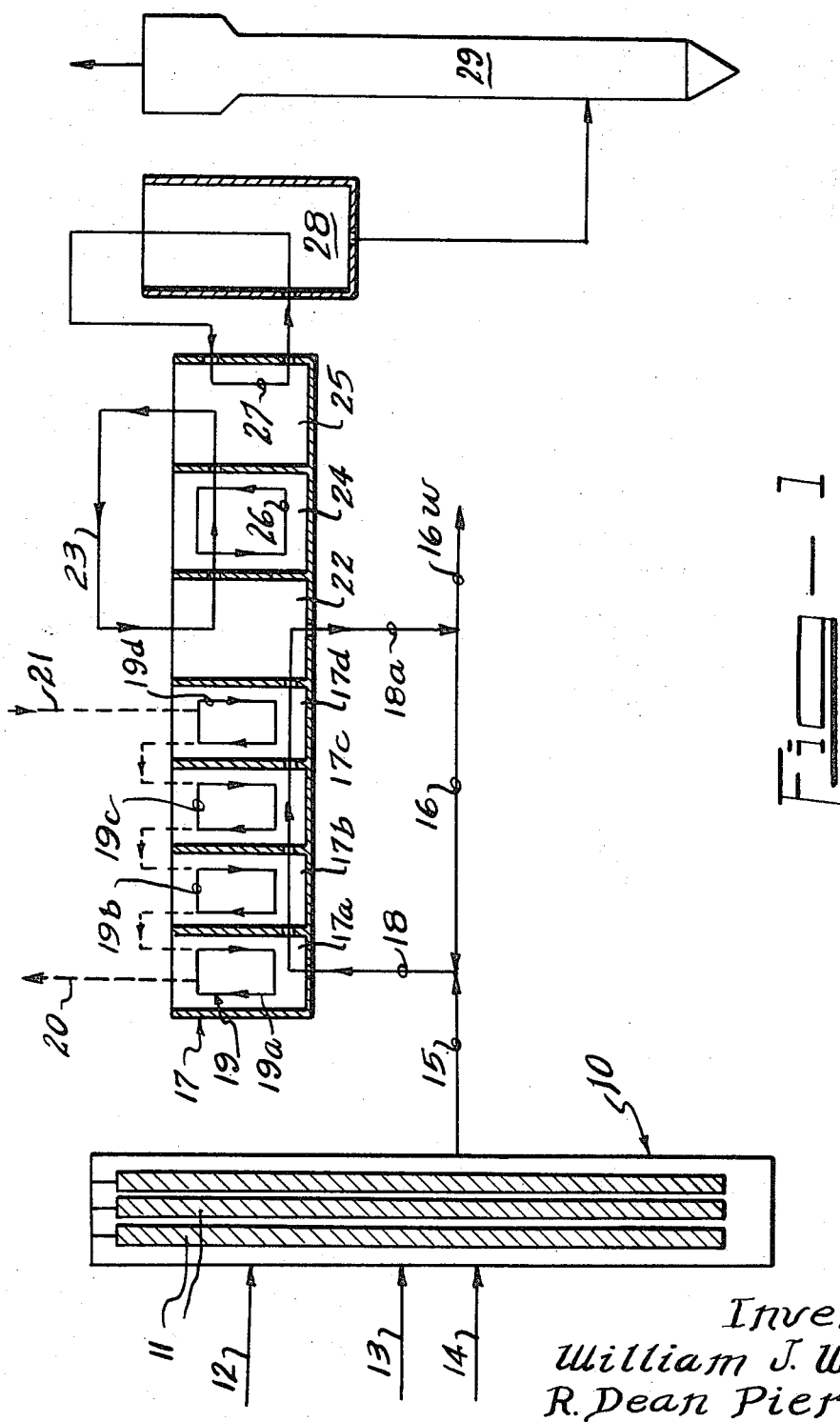
FIG. 1 is a flow diagram for a representative process of this invention.

The invention will first be explained with respect to the process and thereafter with respect to apparatus in which the process may be performed. FIG. 1 is a flow diagram in which a dissolver 10 is charged with a stainless steel clad plutonium dioxide-uranium dioxide fuel subassembly 11, shorn of major portions of its hardware. Consecutively, streams of molten zinc 12, molten metal reduction salt 13, and molten magnesium-copper-calcium alloy 14 are charged to dissolver 10. Molten zinc will dissolve stainless steel but not affect the oxide fuel, as shown in a copending patent application of W. J. Walsh and R. Dean Pierce, application S.N. 814,313 filed Apr. 8, 1969, now Pat. No. 3,567,648 dated Mar. 2, 1971. After dissolution of the stainless steel is complete, various volatiles and the zinc-stainless steel solution are transferred from dissolver 10 to waste. The reduction salt 13 may be various alkali earth halides, but a combination of calcium chloride and calcium fluoride is preferred. The calcium in alloy 14 reduces the fuel oxides to form the respective metals. The plutonium present in the fuel, as well as various rare earth, noble metal and refractory metal fission products, transfers to the magnesium-copper alloy which is now depleted in calcium. The calcium, initially present in stream 14, has been oxidized to calcium oxide in the reduction of the various plutonium or fission product values. The magnesium-copper-plutonium-fission product alloy leaves dissolver 10 as product stream 15; uranium present in subassembly 11 as well as some fission products leave dissolver 10 in a different product stream (not shown) having a different magnesium-copper composition to be purified in a process similar to the one hereinafter described. Dissolver 10 is operated somewhat as a batch process in that a fixed number of subassemblies 11 are dissolved at a time.

Production stream 15 is combined with a magnesium-copper recycle stream 16 and flows into a plurality of mixer settlers 17 as a continuous feed stream 18, the first mixer-settler in the series being denoted as 17a. Mixer-settlers 17 are representative of n stages, each of which has a captive salt phase. The numerical value of n is determined as hereinafter explained. In mixer-settlers 17 the continuous feed stream 18 is simultaneously mixed with and separated from a molten salt 19 into which some rare earth fission products transfer. Each mixer-settler 17a–d contains its own salt 19a–d which remains captive within the respective mixer-settler, that is the salt in each mixer-settler is a batch charge while feed 18 is a continuous stream flowing from one mixer-settler to another. As shown by the dotted lines, provision is made for periodically transferring salt 19d to mixer-settler 17c, salt 19c to mixer-settler 17b, salt 19b to mixer-settler 17a and for discharging salt 19a as waste stream 20 for reasons and with apparatus hereinafter explained. Make-up salt stream 21 introduces new salt into mixer-settler 17d after the above discharge and series of transfers have taken place.

Mixer-settler 22 is representative of p stages, each of which is a continuous flow countercurrent exchanger where plutonium is transferred from the feed alloy 18 to a salt 23 which need not be, but for convenience is, the same composition as salts 19. Part 18a of the magnesium-copper feed alloy 18 now depleted in plutonium flows back to mixer-settler 17a as recycle stream 16 and part flows to waste as stream 16w. Salt 23, containing plutonium in the form of a chloride salt, flows as a continuous feed into and through mixer settlers 24 and 25 which are representative of the last m stages, each stage containing a captive metal phase.

Mixer-settler 24 has a captive phase an alloy 26 which is continuously and simultaneously mixed with and separated from salt feed 23 and removes noble and refractory metals from the salt. In mixer-settler 25, plutonium transfers from salt feed 23 into an acceptor alloy 27 which flows into a retorting vessel 28 where the constituents of alloy 27 are distilled away and returned to mixer-settler 25 while plutonium remains in the vessel and is transferred to a converter 29. In the converter 29, the plutonium is combined with uranium from the process (not shown) and converted into a mixed oxide fuel. The acceptor alloy 27 is never rejected to waste as shown by the closed loop in the figure and only needs an occasional addition of the most electropositive constituent due to losses thereof incurred in the reduction of the plutonium chloride values from salt 23. Similarly, the salt 23 also forms a closed recirculating loop and is reusable indefinitely.

In the process as shown, the first four stages, mixer-settlers 17a–d, are employed to extract rare earth fission products into the captive salts 19a–d; for example, lanthum, cerium, praseodymium, neodymium, promethium, samarium, europium, gadolinium, terbium and dysprosium are representative of those rare earth fission products which are extracted into the salt. Yttrium is also extracted and the term "rare earths" should hereinafter be construed to include yttrium. The extraction takes place by means of oxidation as shown in the above-referenced U.S. patent applications. The number of rare-earth fission-product extraction stages employed in any particular process depends upon the required degree of purification. The use of four stages permits a decontamination factor for rare earth fission products of $10^6$ to $10^8$, while the use of two stages results in a decontamination factor of $10^3$ to $10^4$. The decontamination factor is the ratio of the quantity of fission products in the subassembly 11 divided by the quantity of fission products in the final product. Although various salts may be used to effect the decontamination, a mixture of magnesium chloride, various alkali metal chlorides and some magnesium fluoride is preferred.

For convenience, salts 19a–d are the same and should contain as much magnesium chloride as possible for effective fission product transfer. The melting point of magnesium chloride is over 700° C. and alkali metal chlorides are added to reduce the melting point of the salt while magnesium fluoride is added to enhance the separation of the salt 19 from the metal feed 18 in the mixer-settlers. The following salt composition is preferred: 49 mole percent (m/o) $MgCl_2$—29 m/o NaCl—19 m/o KCl—3 m/o $MgF_2$. A Mg—29 atom percent (a/o) Cu—34 a/o Ca alloy 14 is preferred but there is considerable leeway which is considered acceptable as is true for the $CaCl_2$—20 m/o $CaF_2$ reduction salt 13 which is the preferred composition. The final wash alloy 26 is a Mg—90 w/o Cd alloy but others such as zinc-cadmium are acceptable; the acceptor alloy 27 may also be a Cd-Mg alloy or a Cd-Mg-Zn alloy but a Zn-Mg alloy is preferred.

In summary then, n captive salt stages may be used in the process depending upon the extent of decontamination required. P stages may be used in lieu of the fifth stage in the process described as mixer-settler 22 in which the plutonium values are transferred from feed alloy 18 to salt 23. The composition of salt 23 need not be, but for convenience is, the same as the composition of salts 19. Although noble and refractory metal fission products such as niobium, zirconium, molybdenum, technetium, ruthenium, palladium and silver are present in feed stream 18 they do not transfer with the plutonium values to salt 23. Here as in the first four stages a decontamination takes place, and the number of stages used for the noble and refractory metal decontamination depends upon the extent of decontamination required. Part of the magnesium-copper feed alloy 18a flowing out of mixer-settler 22 can be rejected to waste as stream 16w in order to prevent excessive accumulation of the noble and refractory metals in the feed 18 to mixer-settlers 17, and the rest of stream 18a would be recycled as stream 16 to the first mixer-settler 17a. The use of waste stream 16w depends upon the extent of the aforementioned accumulation. The last m stages of the process are captive metal stages and the last q of the last m stages have an acceptor alloy 27 in them. The number of these stages depends upon the specific alloy 27 or alloys employed and the decontamination required.

The distribution of plutonium and fission products between the salt and metal phases follows. In the first mixer-setter 17a, some of the rare earth fission products are extracted into salt 19a along with some plutonium. Feed alloy 18 then flows into mixer-settler 17b where more of the rare earth fission products extract into salt 19b along with some plutonium, and this process continues for each of the mixer-settlers. The salt solubility for the rare earth fission products is greater than for the plutonium, but some plutonium does extract into each of salt phases 19a–d. In the fifth stage, mixer-settler 22, the magnesium-copper feed alloy 18 now depleted in most of the rare earth fission products and also containing a diminished amount of plutonium, contacts salt 23 into which extracts a majority of the plutonium values left in the alloy. The plutonium-depleted feed 18a is then recycled to the series of mixer-settlers 17 in each of which the feed 18 is mixed with the salt 19. Since feed 18 is now depleted in plutonium and equilibrium is established between the feed and the particular salt 19, some of the plutonium transfers out of the salt into the feed. When alloy 18 again contacts salt 23, the salt has given up some of its plutonium values to alloy 27 and therefore salt 23 is plutonium-poor. Plutonium transfers from alloy 18 to salt 23. This process is continued until the required amount of plutonium has transferred from each and every one of the mixer-settlers 17a–d to salt 23 and hence to acceptor alloy 27. When the required amount of plutonium has transferred a part of the magnesium-copper feed 18 can be rejected to waste as stream 16w, and the salts 19 are transferred from one stage to the other as hereinbefore described resulting in the rejection to waste of some of the salt as stream 20 and the addition of new salt to the process as stream 21.

The plutonium values which were transferred to salt 23 flow into mixer-settler 24 containing a captive magnesium-cadmium alloy that acts as a wash for salt 23 and provides additional decontamination for noble and refractory metal fission products. The number of washes provided, that is the number of stages, is determined by the decontamination desired. The process as described shows one stage but numerous stages may be used with various alloys as batch or captive phases depending upon the type of fission products present and the extent of decontamination desired. The magnesium-cadmium alloy 26 in mixer-settler 24 may be reused for a number of subassemblies 11 but eventually is discarded to waste in the same manner and with the same apparatus as will be described hereinafter for salt waste 20.

It will be appreciated that the process as heretofore described is not restricted to the apparatus which next be described. For example, the fluid mixing process may be effected in a mixer-settler, centrifugal contactor or any other process unit adaptable to semi-continuous operation with multiple solvents including both captive and continuously flowing fluids. The apparatus in which this process may be practiced will now be described.

Figure 2:
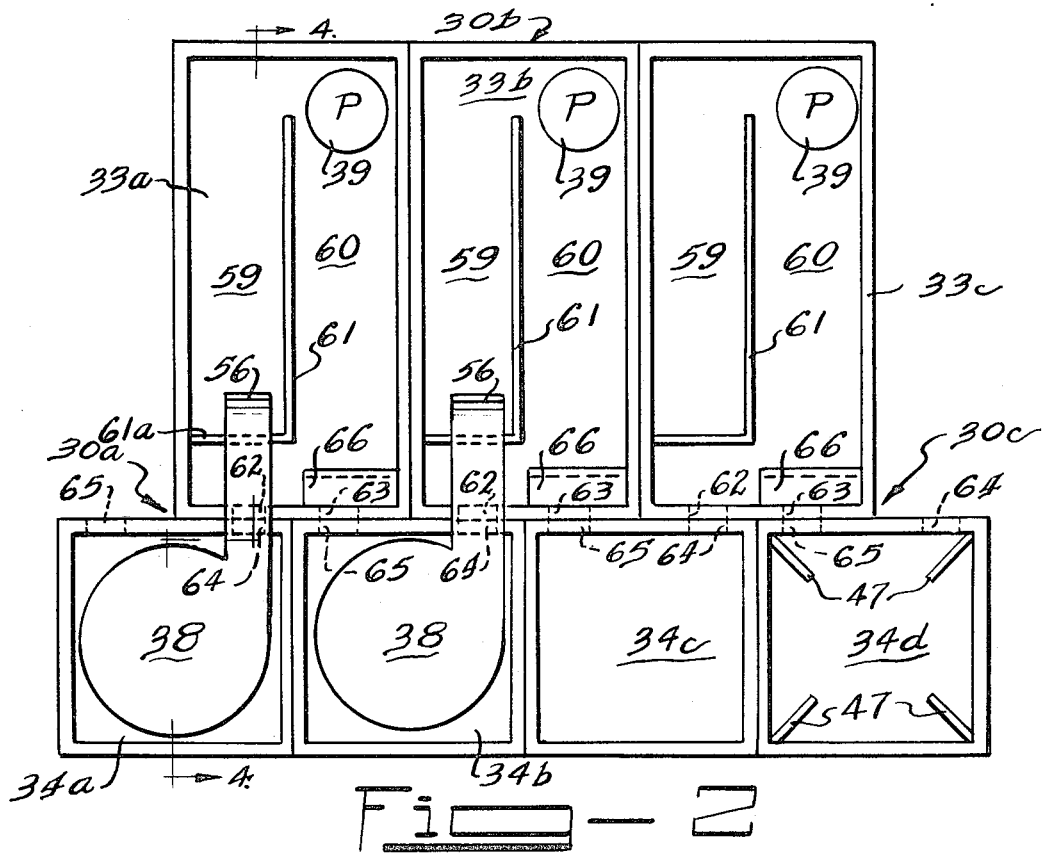
FIG. 2 is a plan view of a series of mixer-settlers having a captive light phase.
Figure 3:
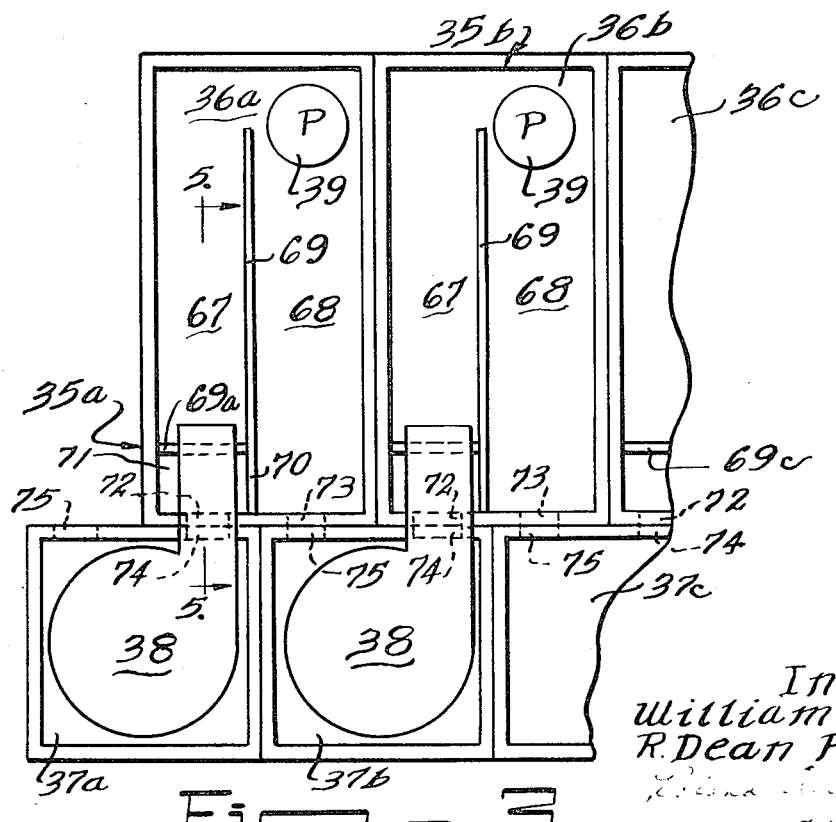
FIG. 3 is a plan view of a series of mixer-settlers having a captive heavy phase.

Referring now to FIGS. 2 and 4, which show mixer-settlers 30a–c as representative of the case where a heavy metal phase 31 is the feed solution continuously flowing through the mixer-settlers while a light salt phase 32 continuously flows in each mixer-settler 30a or 30b or 30c but remains captive and does not flow between the various mixer-settlers. The mixer-settlers 30 comprise a plurality of settling chambers 33a–c rectangular in shape abutting each other on their longer dimensioned sides. On one of their shorter dimensioned sides, settling chambers 33 contact a plurality of mixing chambers 34a–d, square in cross section, which abut each other as well as the settling chambers. Each settling chamber 33 abuts two mixing chambers 34 and vice versa. A similar arrangement is shown in FIG. 3 wherein mixer-settlers 35a and b are representative of the case where a heavy metal phase, for instance, the magnesium-cadmium alloy 26 in the process hereinbefore described, is the captive or batch phase while the continuous flow light liquid or salt phase, for instance feed salt 23, is the feed stream. Settling chambers 36a and b with mixing chambers 37a and b are similarly shaped and arranged as previously described for settling chambers 33 and mixing chambers 34. In each case mixing chambers 34 or 37 are below the respective settling chambers 33 and 36 so that mixed liquid in chambers 34 or 37 does not leak out of chambers 34 or 37.

Reference to FIG. 4 shows a combination mixer-pump 38 used to mix heavy phase 31 and light phase 32 and pump the mixed phases from a mixing chamber 34 to a settling chamber 33. The mixer-pump 38 hereinafter described will be the same whether the captive phase is a metal or a salt. As seen in FIGS. 2 and 3, a pump 39 is present in each settling chamber 33 and 36 similar to mixer-pump 38 except that pump 39 does not have mixing capability. Pump 39 is present to effect the periodic salt transfer from stage 17d to 17c to 17b to and from 17a to waste as hereinafter explained.

In each mixing chamber 34 is an elongated, rotatable, hollow, cylindrical casing 40 closed at its upper end by a plate 41 and rotated (by means not shown). Casing 40 has a larger diameter upper section 42 and a smaller diameter lower section 43. Fixed to the smaller diameter section 43 are two sets of mixing vanes 44 and 45 vertically displaced from each other, each vane 46 is generally rectangular in shape with its longer dimensioned side parallel to the longitudinal axis of casing 40. Each set of vanes 44 and 45 comprise a plurality of vanes equally spaced about the periphery of casing 40, six being used in the embodiment shown in the drawing.

Each mixing chamber 34, but only shown in 34d, has a set of four vertical baffles 47 extending the length of the mixing chamber, each positioned on a diagonal of the mixing chamber and abutting each corner of the chamber. The baffles 47 may have cutouts in them to accommodate vanes 46 if the vanes are otherwise too wide. In addition to the diagonal vertical baffles 47, each mixing chamber 34 has two horizontal baffles 48 and 49 in the form of plates normal to the longitudinal axis of cylindrical casing 40, each baffle having circular apertures therein larger in diameter than the outer diameter of the casing. Baffle 48 is positioned above mixing vanes 44 at the discontinuity of the larger diameter section 42 and the smaller diameter section 43 of casing 40, and baffle 49 is positioned between the sets of vanes 44 and 45. A horizontal disk 49b is attached to cylindrical casing 40 at the same elevation as baffle 49. Disk 49b extends outwardly about the same distance as do vanes 46 which leaves a rather small annular opening between baffle 49 and disk 49b. More than one set of vanes 45 can be employed if desired with additional baffles 49 and disks 49b being located between each set of vanes. In addition to the above baffles is a cylindrical baffle or sleeve 49a surrounding the larger diameter section 42 of casing 40 extending to a point proximate but not touching horizontal baffle 48.

As cylindrical casing 40 rotates, liquid in the mixing chambers 34 or 37 is raised and sucked upwardly through the cylinder and exits through ports 50 in the cylinder wall proximate top plate 41. Collecting means 51 is formed of inner and outer concentric cylinders 52 and 53, respectively, which define therebetween a trough 54 and an inner space 55 between casing 40 and inner concentric cylinder 52 of the collecting means. Mixed liquid discharged through ports 50 is collected in trough 54 and fed via pipe 56 to a settling chamber 33. Pipe 56 extends into settling chamber 33 to prevent splashing of the mixed liquid. A shroud 57 having a biased lower edge 58 may surround pump 38 interior to inner concentric cylinder 52. Depending upon the vertical position of shroud 57 with respect to exit ports 50, more or less of the mixed liquid exiting through the ports is caused to reflux to mixing chamber 34 via inner space 55 instead of flowing into trough 54 and then through pipe 56 to the settling chamber 33. An inverted cup (not shown) may be affixed to and positioned about casing 40 in trough 54 to prevent splashing, evaporization and subsequent condensation of magnesium as it exits through ports 50. Splashing is caused by contact of the liquid having a rotational vector with a stationary object, such as outer cylinder 53.

The difference between the settling chambers 33 which contain a captive or batch light phase 32 and the settling chambers 36 which contain a captive or batch heavy phase 31 will now be explained.

With reference to FIGS. 2 and 4 each settling chamber 33 is adapted to recycle a light phase between it and an associated mixer chamber 34. Since the settling chambers 33a–c are identical, chamber 33a will be used as an example. As shown in the figures, settling chamber 33a is divided into two compartments 59 and 60 by means of a backward L-shaped baffle 61. The baffle 61 has a crosspiece 61a in contact with a longer dimensioned side of chamber 33a proximate the shorter dimensioned side abutting mixing chamber 34a and baffle 61 extends at its other end to a point proximate the other smaller dimensioned side of the settling chamber. The two compartments 59 and 60 are therefore joined at their outer ends. The baffle 61 as shown in FIG. 4, extends from the bottom of settling chamber 33a to a point proximate the top of the settling chamber, and the settling chamber, itself, is higher than the mixing chamber 34. The connections between the settling chamber 33a and the mixing chambers 34a and 34b consist of vertically and horizontally spaced apertures 62 and 63 which are aligned with corresponding apertures 64 and 65 in mixing chambers 34a and 34b, respectively. As seen in FIG. 4, apertures 62 and 64 are nearer the top of chambers 33a and 34a than apertures 63 and 65. A conduit 66, in the form of an enclosed duct which contacts two walls of settling chamber 33a, encloses aperture 63 and provides for flow of liquid metal 31 through apertures 63 and 65 but prevents any salt 32 flow therethrough due to the proximity of the conduit with the bottom of the settling chamber.

Pipe 56 from collecting means 51 terminates in compartment 59 so that mixed liquid from mixing chamber 34a is introduced to settling chamber 33a at a point in compartment 59 separated from apertures 62 and 64 by baffle 61. The presence of the baffle 61 and cross-piece 61a prevents back-mixing of the mixed liquid from pump 38 with the separated liquids which flow through apertures 62 and 64.

The physical arrangement in the settling chambers 36a–b adapted to recycle a heavy phase to the associated mixing chambers 37a–b are similar to those described for chambers 33 and 34 identical to each other. As shown in FIGS. 3 and 5 settling chamber 36a is divided into two compartments 67 and 68 by means of a backward L-shaped baffle 69. The backward L-shaped baffle 69 has a cross-piece 69a in contact with a longer dimensioned side of chamber 36 proximate the shorter dimensioned side abutting chamber 37, and baffle 69 extends at its other end to a point proximate the other shorter dimensioned side of chamber 36. Compartments 67 and 68 are therefore joined at their outer ends like compartments 59 and 60. An extension 70 of baffle 69 connects baffle 69 with the shorter dimensioned side of settling chamber 36a abutting mixing chamber 37a. Extension 70, as shown in FIG. 5, does not extend to the bottom of the settling chamber 36a and with baffle 69 forms a conduit 71 similar to conduit 66. Conduit 71 provides a metal-only area in settling chamber 36a for transporting metal from compartment 68 through aligned apertures 72 and 73 in chambers 36a and 37a respectively. Salt is transferred from compartment 68 to mixing chamber 37b by means of aligned apertures 74 and 75 in settling chambers 36a and mixing chamber 36b respectively; apertures 72 and 74 are horizontally and vertically displaced from each other similar to the displacement between apertures 62 and 63. However, in this case the metal transport aperture 72 is adapted to recycle the heavy phase to the mixing chamber 37a from which it came rather than passing it to another mixing chamber. As in settling chamber 33a, the mixed liquid from mixing chamber 37a is introduced into compartment 67 so as to prevent back-mixing of the mixed liquid with the separated phase exiting compartment 68 through apertures 72 and 74.

Combining the described process shown in FIG. 1 with the described apparatus, FIGS. 2–5, feed stream 18 flows into mixing chamber 34a of mixing-settler 17a and is mixed with salt 19a by the action of mixing vanes 44 and 45. Salt 19a is continuously circulating between mixing chamber 34a and settling chamber 33a through apertures 62 and 64. Diagonal vertical baffles 47 enhance the mixing efficiency of pump 38 while the greater diameter section 42 increases the pumping capacity of the pump. A mixture of salt 19a and feed stream 18 is sucked up cylindrical casing 40 and discharges through ports 50 into pipe 56 and compartment 59. As the mixed liquid flows around baffle 61 it separates into salt phase 19a and feed stream 18, the mass transfer of rare-earth fission-product values having taken place during the residence time in mixing chamber 34a and in the pump 38. The heavy metal phase (feed stream 18 in FIG. 1 and metal phase 31 in FIG. 4) flows into the conduit 66 and out of settling chamber 33a through aperture 63 into mixing chamber 34b via aperture 65. Simultaneously with the metal transfer, salt 19a flows back through aperture 62 into mixing chamber 34a where it mixes with more of feed stream 18 (remember stream 18 is continuously flowing due to recycle stream 16) and whatever portion of the mixed liquid is refluxed due to shroud 57. This process is repeated for the identical stages represented by mixing-settlers 17a–d.

Horizontal baffles 48 and 49 and disk 49b insure that a greater percentage of the salt 19a and metal 18 remain in mixing chamber 34a for a time close to the average residence time and permits very little of the salt and metal to flow quickly through the mixing chamber without having time to contact each other. While baffles 48 and 49 do not increase the residence time in the mixing chamber 34, they do insure that all of the liquid feed passes through regions of intense agitation so no liquid flows directly into casing 40 without being mixed; a fact very important to the effectiveness of the mass transfer of fission products between salt and metal. Sleeve 49a prevents gas entrainment in the mixed liquids due to turbulence in the liquid caused by rotation of a cylindrical casing 40 in chamber 34 having a square or rectangular cross section. The benefit of sleeve 49a is twofold: (1) vortexing of the liquid results instead of turbulence, thereby minimizing gas entrainment and increasing the mixing and pumping efficiency and (2) a definite mixing volume is established. Since the liquid inside sleeve 49a is not mixed and the liquid between the sleeve and the mixing chamber wall is quiescent, the only mixing area in mixing chamber 34 is the space below baffle 48. The volume of this space is readily determined so the horsepower per volume of mixed liquid is a known quantity.

The metal feed stream 18 exits from settling chamber 33d into mixer-settler 22 where there is no captive phase. After feed stream 18 is mixed with salt 23, the metal phase is in part recycled as stream 16 to mixer-settler 17a and in part rejected to waste 16w, while the salt 23 continues as a feed stream to the last two stages which have captive metal phases, per FIGS. 3 and 5. The apparatus for mixer-settler 22 is similar to that described except that the entering salt 23 and metal 18 are introduced into the mixing chamber and the separated phases flow out of the settling chamber not to the mixing chamber but in one case to recycle stream 16 and in the other case to mixing chamber 24.

The last $m$ stages, represented by mixer-settlers 24 and 25, are described with reference to FIGS. 3 and 5 wherein the heavy phase is captive within each mixer-settler. The mixing and separating procedures are identical as hereinbefore described. The last $q$ of the last $m$ stages are mixer-settlers having as a captive phase, a zinc-magnesium acceptor alloy for transfer of plutonium from salt 23 into the alloy. It is contemplated that only one such stage is needed.

The mixer-settler according to the present invention lends itself to a modular construction wherein the desired number of types of mixing chambers and settling chambers are assembled to satisfy a particular purpose. This modular construction provides great flexibility in meeting the requirements of an extraction process by the ready addition or removal of individual stages. It also provides easy means for service, repair or replacement of individual components.

While the foregoing description has been limited to specific shapes of mixer-settlers and specific solvents for the mass-transfer operations it should be clear that the invention is not limited to them. Equivalent materials appearing in the patents cited herein and equivalent apparatus, such as cylindrical mixer-settlers or a standpipe having an open bottom end in lieu of the conduits, are intended to be include within the definition of the invention appearing in the appended claims.

The embodiments of the invention in which an exclusive property or privilege is claimed are defined as follows:

1. A method of separating a valuable metal selected from the group consisting of uranium and plutonium from fission product contaminants comprising establishing and maintaining a plurality of batch solvents consisting of liquid salts, flowing a feed solution containing said valuable metal dissolved in a liquid metal solvent sequentially into and through said batch solvents, mixing the feed solution and the batch solvents, separating the feed solution from the batch solvents whereby said batch solvents remove certain fission products from said feed solution which becomes increasingly more pure as it sequentially passes through each batch solvent, removing the valuable metal from the feed solution after it has passed through all of the batch solvents, recycling the liquid metal solvent remaining after the valuable metal has been removed therefrom to the first batch solvent and through the batch solvents until all of the valuable material is washed from the first batch solvent, discarding the first batch solvent when all of the valuable metal has been washed therefrom, thereupon transferring batch solvent between stages, adding a fresh batch solvent to the last stage and discarding a portion of the liquid metal solvent after the valuable metal has been removed therefrom to prevent excessive accumulation of noble and refractory metal fission products therein.

2. The method of claim 1 wherein the valuable metal is plutonium and the contaminants are the rare earth fission products.

3. The method of claim 2 wherein the liquid metal solvent is a magnesium-copper alloy, the liquid salt used as batch solvent is a mixture of magnesium chloride, sodium chloride, potassium chloride and magnesium fluoride and the plutonium is removed from the feed solution after it has passed through all of the batch solvents with a mixture of magnesium chloride, sodium chloride, potassium chloride and magnesium fluoride.

4. The method according to claim 3 wherein the salt containing the plutonium removed from the feed solution is contacted with magnesium—90 mol percent cadmium alloy to remove noble metal fission products therefrom.

5. The method according to claim 4 wherein the plutonium is removed from the salt from which noble metal fission products have been removed with a zinc-magnesium alloy.

References Cited

UNITED STATES PATENTS

| | | | |
|---|---|---|---|
| 3,326,673 | 6/1967 | Knighton et al. | 23—325 |
| 3,284,190 | 11/1966 | Knighton et al. | 75—84.1 |
| 3,282,681 | 11/1966 | Knighton et al | 75—84.1 |
| 2,968,547 | 1/1961 | Lyon et al. | 75—84.1 |
| 2,948,586 | 8/1960 | Moore | 23—325 |

OTHER REFERENCES

Perry, Chemical Engineers' Handbook, McGraw-Hill Book Co., 1950, pp. 716–718.

CARL D. QUARFORTH, Primary Examiner

B. H. HUNT, Assistant Examiner

U.S. Cl. X.R.

23—325; 252—301.1